United States Patent
Jeon et al.

(10) Patent No.: US 11,279,113 B2
(45) Date of Patent: Mar. 22, 2022

(54) METHOD FOR PREPARING POLYMER FILM

(71) Applicants: SK INNOVATION CO., LTD., Seoul (KR); SK IE TECHNOLOGY CO., LTD., Seoul (KR)

(72) Inventors: Seung-Min Jeon, Daejeon (KR); Jin-Hyung Park, Daejeon (KR); Sang-Yoon Park, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 198 days.

(21) Appl. No.: 15/763,755

(22) PCT Filed: Sep. 30, 2016

(86) PCT No.: PCT/KR2016/010988
§ 371 (c)(1),
(2) Date: Mar. 27, 2018

(87) PCT Pub. No.: WO2017/057957
PCT Pub. Date: Apr. 6, 2017

(65) Prior Publication Data
US 2018/0297330 A1   Oct. 18, 2018

Related U.S. Application Data

(63) Continuation of application No. PCT/KR2016/010988, filed on Sep. 30, 2016.

(30) Foreign Application Priority Data

Oct. 2, 2015   (KR) .................. 10-2015-0139041

(51) Int. Cl.
B32B 15/088   (2006.01)
C08J 5/18     (2006.01)
(Continued)

(52) U.S. Cl.
CPC .......... *B32B 15/088* (2013.01); *B32B 27/281* (2013.01); *C08G 73/1039* (2013.01);
(Continued)

(58) Field of Classification Search
CPC ... B32B 15/088; B32B 27/281; C09D 179/08; C08G 73/1067; C08G 73/1039;
(Continued)

(56) References Cited

U.S. PATENT DOCUMENTS

2004/0247916 A1* 12/2004 MacDonald ............... C08J 5/18
                                                          428/523
2009/0123698 A1   5/2009 Nishino et al.
(Continued)

FOREIGN PATENT DOCUMENTS

JP   2002-361659   12/2002
JP   2008-230018   10/2008
(Continued)

OTHER PUBLICATIONS

English Translation of JP2009226632 (Year: 2009).*
(Continued)

*Primary Examiner* — Timothy Kennedy
*Assistant Examiner* — Olukorede Esan
(74) *Attorney, Agent, or Firm* — IP & T Group LLP

(57) ABSTRACT

The present invention provides a method for preparing a polymer film, comprising the steps of: forming a precursor film by drying a polymer precursor; and forming a polymer film by curing the precursor film, wherein the curing of the precursor film is carried out on a substrate film.

8 Claims, 1 Drawing Sheet

(51) Int. Cl.
  *C09D 179/08* (2006.01)
  *C08G 73/10* (2006.01)
  *C08J 3/24* (2006.01)
  *C08L 79/08* (2006.01)
  *B32B 27/28* (2006.01)

(52) U.S. Cl.
  CPC ............ *C08G 73/1067* (2013.01); *C08J 3/24* (2013.01); *C08J 5/18* (2013.01); *C08L 79/08* (2013.01); *C09D 179/08* (2013.01); *C08J 2379/08* (2013.01); *C08L 2201/10* (2013.01); *C08L 2203/16* (2013.01)

(58) Field of Classification Search
  CPC ......... C08J 73/24; C08J 5/18; C08L 2201/10; C08L 2203/16; C08L 79/08
  See application file for complete search history.

(56) References Cited

U.S. PATENT DOCUMENTS

2010/0230142 A1* 9/2010 Bamba ................. H05K 3/0055
  174/255
2011/0033682 A1* 2/2011 Shimizu ................... B32B 7/02
  428/213
2014/0178700 A1* 6/2014 Iwase ...................... C09D 7/63
  428/447
2017/0198164 A1* 7/2017 Itagaki ................... B32B 27/36

FOREIGN PATENT DOCUMENTS

| | | | | |
|---|---|---|---|---|
| JP | 2009226632 | * | 8/2009 | ............ B29C 41/24 |
| JP | 2009-226632 | | 10/2009 | |
| JP | 2013-079344 | | 5/2013 | |
| JP | 2013-082774 | | 5/2013 | |
| KR | 1020030007101 | | 1/2003 | |
| KR | 10-2008-0094841 A | | 10/2008 | |
| KR | 1020090065750 | | 6/2009 | |
| KR | 1020110031293 | | 3/2011 | |
| KR | 1020120078510 | | 7/2012 | |
| KR | 101232534 | * | 2/2013 | ............ C08G 61/12 |

OTHER PUBLICATIONS

English translation of KR101232534 (Year: 2013).*
Office Action issued by the Korean Intellectual Property Office dated Nov. 23, 2021.

* cited by examiner

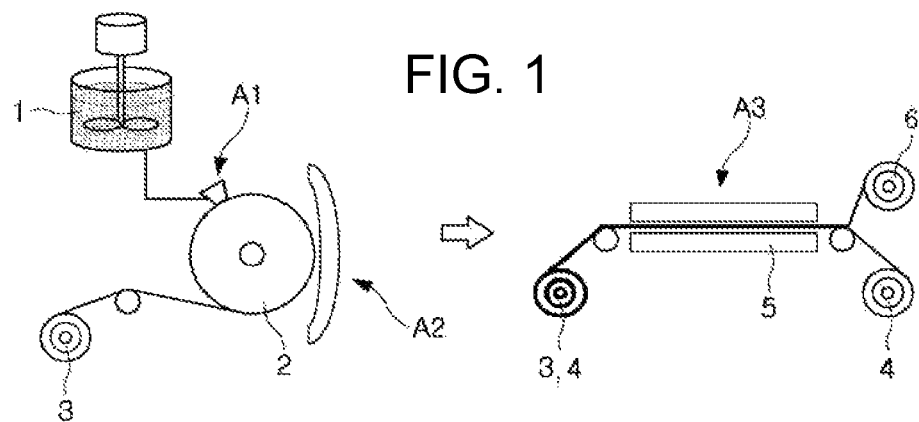
FIG. 1
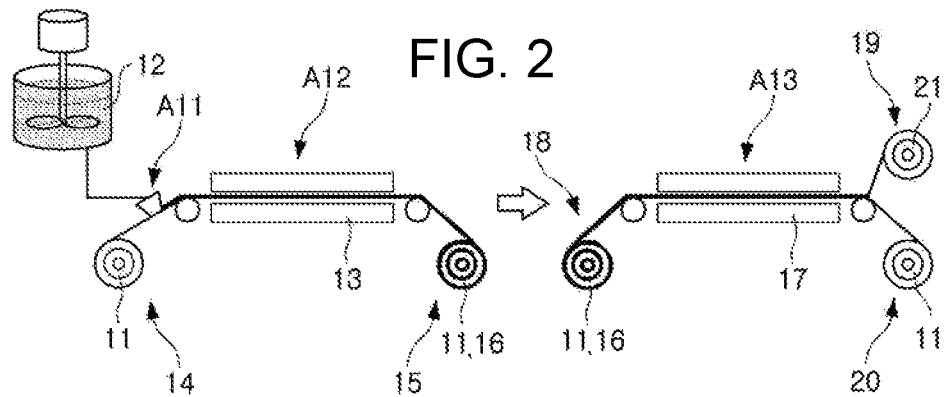
FIG. 2
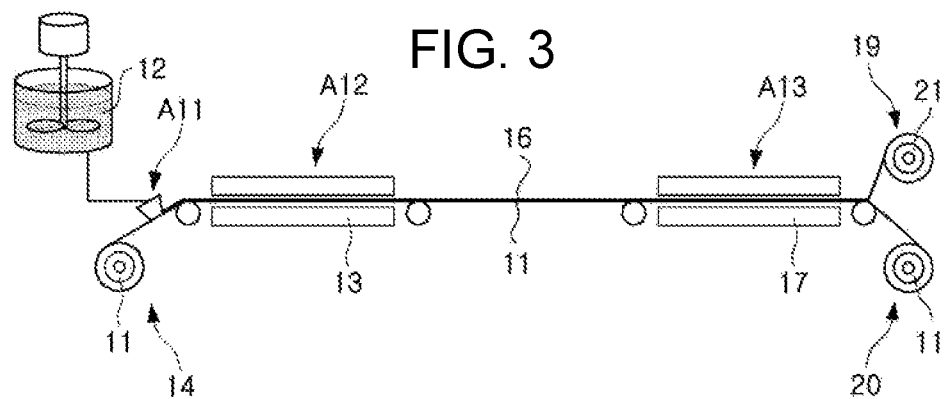
FIG. 3
FIG. 4
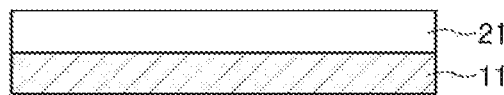

METHOD FOR PREPARING POLYMER FILM

This application is a national stage application of PCT/KR2016/010988 filed on Sep. 30, 2016, which claims priority of Korean patent application number 10-2015-0139041 filed on Oct. 2, 2015. The disclosure of each of the foregoing applications is incorporated herein by reference in its entirety.

TECHNICAL FIELD

The present disclosure relates to a method for manufacturing a polymer film.

BACKGROUND ART

Polymer films are widely used as insulative materials for forming circuits and devices, as polymer films have outstanding heat-resistance, mechanical, and electrical characteristics.

In recent years, materials improved in terms of heat resistance, such as polyethylene terephthalate (PET), polyethylene naphthalate (PEN), or polyethylene sulfone (PES), have been developed, and the use these materials as transparent materials in the electronic material field has been attempted. However, the heat resistance of such materials remains unsatisfactory, and thus, there is increasing need for polymer films, such as a polyimide film, capable of overcoming this problem.

In general, polymer films are prepared through a solution casting process, a drying process, and a high-temperature heat treatment process, and particularly, high-temperature heat treatment equipment, including a heat-treatment tenter device, is used in the high-temperature heat treatment process. However, such a heat-treatment tenter device is significantly expensive and requires a high-degree of operational skill, and thus it is difficult to prepare a polymer film using heat treatment equipment including such a device.

DISCLOSURE

Technical Problem

One of the aspects of the present disclosure is to provide a method for easily preparing a polymer film with low cost and a high yield.

Technical Solution

One of proposals of the present disclosure is to provide for preparing a polymer film by curing a precursor film on a base film without using an expensive tenter device.

According to an aspect of the present disclosure, a method for manufacturing a polymer film may include: drying a polymer precursor to form a precursor film; and curing the precursor film to form a polymer film, wherein the precursor film may be cured on a base film.

According to another aspect of the present disclosure, a method for manufacturing a polymer film may include: transferring a wound base film to a drying apparatus; casting a polymer precursor onto the base film during the transferring of the base film; drying the polymer precursor, cast onto the base film during the transferring, by using the drying apparatus to form a precursor film; transferring the base film, on which the precursor film is formed, to a curing apparatus; curing the precursor film formed on the base film by using the curing apparatus so as to form a polymer film; and separating the polymer film from the base film.

Advantageous Effects

One of effects of the present disclosure is to provide a method for easily preparing a polymer film with low cost and a high yield.

DESCRIPTION OF DRAWINGS

FIG. 1 is a schematic view illustrating an exemplary polymer film preparing processes.

FIG. 2 is a schematic view illustrating other exemplary polymer film preparing processes.

FIG. 3 is a schematic view illustrating other exemplary polymer film preparing processes.

FIG. 4 is a cross-sectional view schematically illustrating an example of a polymer film formed on a base film.

BEST MODE

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity. Furthermore, in the drawings illustrating embodiments, the same reference numerals may be used throughout to designate elements having the same function within the same technical scope.

FIG. 1 is a schematic view illustrating an exemplary polymer film preparing process.

Referring to FIG. 1, according to an embodiment, a polymer film preparing method includes a process of forming a precursor film 3 by drying a polymer precursor 1 and a process of curing the precursor film 3 to form a polymer film 6, wherein the precursor film 3 is cured on a base film 4.

In detail, the polymer film preparing method of the embodiment includes a process A1 of casting a polymer precursor 1, a process A2 of drying the cast polymer precursor 1 to form a precursor film 3, and a process A3 of performing a high-temperature heat treatment on the precursor film 3 to prepare a polymer film 6, wherein the precursor film 3 is cured on a base film 4. For example, after the precursor film 3 is formed, the precursor film 3 may be disposed on the base film 4, for example, using an adhesive, and the precursor film 3 may be cured on the base film 4.

In this case, a drying apparatus 2 including a belt device or a drum device is used to perform the casting process A1 and the drying process A2. However, a high-temperature heat treatment apparatus 4, including a tenter device, may not be used to perform the high-temperature heat treatment process A3.

If the precursor film 3 is cured on the base film 4, contraction of the precursor film 3 caused by the curing process may be minimized, and thus a heat treatment apparatus including an additional tenter device may not be required in the curing process. Thus, the polymer film 6 may be more easily prepared at low cost and with a high yield.

FIG. 2 is a schematic view illustrating other exemplary polymer film preparing processes.

Referring to FIG. 2, in a polymer film preparing method according to another embodiment, a heat treatment apparatus not including a tenter device may be used in a curing process, and furthermore, a drying apparatus including a belt device or a drum device may not be used in a drying process.

In more detail, the polymer film preparing method of the embodiment includes: a process of transferring a wound base film 11 to a drying apparatus 13; a process A11 of casting a polymer precursor 12 onto the base film 11 while the base film 11 is transferred; a process A12 of drying the polymer precursor 12 cast onto the base film 11 using the drying apparatus 13 to form a precursor film 16; a process of transferring the base film 11, on which the precursor film 16 is formed, to a curing apparatus 17; a process of curing the precursor film 16 formed on the base film 11 by using the curing apparatus 17 so as to form a polymer film 21; and a process of separating the polymer film 21 from the base film 11.

According to the polymer film preparing method of the embodiment, casting and drying may be performed using a base film instead of using a belt device or a drum device, and thus a drying apparatus including a belt device or a drum device may not be used during the drying process. In this case, a polymer film 21 may more easily prepared with lower costs and a higher yield when compared to the case of not using only a tenter device.

Hereinafter, each process of the polymer film preparing method of the present disclosure will be described in more detail. Although the following description is given for the case in which a drying apparatus including a belt device or a drum device is not used in a drying process as described in FIG. 2, embodiments of the present disclosure are not limited thereto. That is, for example, as long as a precursor film is cured on a base film, a drying apparatus including a belt device or a drum device may be used as described with reference to FIG. 1.

Base Film Preparing Process

Since a drying process A12 and a curing process A13 are performed on a base film 11 in a state in which a polymer precursor 12 is cast onto a side of the base film 11, the base film 11 is required to have sufficient heat resistance. In addition, the base film 11 is required to have sufficient releasability such that a polymer film 21 may be easily separated from the base film 11 after the drying process A12 and the curing process A13. The heat resistance and releasability of the base film 11 are affected by factors such as the thickness and surface roughness of the base film 11.

The base film 11 may be one selected from the group consisting of polyimide film, copper foil, aluminum foil, stainless steel foil, copper foil coated with polyimide, aluminum foil coated with polyimide, and stainless steel foil coated with polyimide. However, the base film 11 is not limited thereto.

The polyimide, included in the polyimide film, the copper foil coated with polyimide, the aluminum foil coated with polyimide, and the stainless steel foil coated with polyimide that are listed as examples of the base film 11, may be prepared by combining dianhydride and diamine.

Examples of the dianhydride may include pyromellitic dianhydride (PMDA), 3,3',4,4'-biphenyl tetracarboxylic dianhydride (BPDA), 3,3',4,4'-benzophenone tetracarboxylic dianhydride (BTDA), 4,4'-oxydiphthalic anhydride (ODPA), 3,3',4,4'-diphenylsulfone tetracarboxylic dianhydride (DSDA), 2,2-bis(3,4-dicarboxyphenyl)1,1,1,3,3,3-hexafluoropropane dianhydride (6FDA), 4,4'-(4,4'-isopropylidenediphenoxy)bis(phthalic anhydride) (BPADA), 2,3,6,7-naphthalene tetracarboxylic dianhydride, 1,2,5,6-naphthalene tetracarboxylic dianhydride, 1,4,5,8-naphthalene tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,3',4'-biphenyl tetracarboxylic dianhydride, 2,2',3,3'-biphenyl tetracarboxylic dianhydride, 2,3,3',4'-benzophenone tetracarboxylic dianhydride, 2,2',3,3'-benzophenone tetracarboxylic dianhydride, 2,2-bis(3,4-dicarboxyphenyl) propane dianhydride, 1,1-bis(2,3-dicarboxyphenyl)ethane dianhydride, 1,1-bis(3,4-dicarboxyphenyl)ethane dianhydride, bis-(2,3-dicarboxyphenyl)methane dianhydride, bis-(3,4-dicarboxyphenyl)methane dianhydride, 4,4'-(hexafluoroisopropylidene) isophthalic anhydride, bis-(3,4-dicarboxyphenyl)sulfoxide dianhydride, tetrahydrofuran-2,3,4,5-tetracarboxylic dianhydride, pyrazine-2,3,5,6-tetracarboxylic dianhydride, thiophene-2,3,4,5-tetracarboxylic dianhydride, phenanthrene-1,8,9,10-tetracarboxylic dianhydride, perylene-3,4,9,10-tetracarboxylic dianhydride, bis-1,3-isobenzofurandione, bis-(3,4-dicarboxyphenyl)thioether dianhydride, bicyclo[2,2,2]oct-7-ene-2,3,5,6-tetracarboxylic dianhydride, 2-(3',4'-dicarboxyphenyl) 5,6-dicarboxybenzamidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, bis-(3,4-dicarboxyphenyl) 2,5-oxadiazole 1,3,4-dianhydride, bis-2,5-(3',4'-dicarboxydiphenylether) 1,3,4-oxadiazole dianhydride, bis-2,5-(3',4'-dicarboxydiphenylether) 1,3,4-oxadiazole dianhydride, 5-(2,5-dioxotetrahydro)-3-methyl-3-cyclohexene-1,2-dicarboxylic anhydride, 1,2,3,4-cyclobutane dianhydride, 2,3,5-tricarboxycyclopentylacetic dianhydride, and their acid ester and acid halide ester derivatives. However, the dianhydride is not limited thereto. That is, another well-known dianhydride may be used.

Examples of the diamine may include: at least one aromatic diamine selected from the group consisting of p-phenylenediamine, m-phenylenediamine, 2,4,6-trimethyl-1,3-phenylenediamine, 2,3,5,6-tetramethyl-1,4-phenylenediamine, 4,4'-diaminodiphenylether, 3,4'-diaminodiphenylether, 3,3'-diaminodiphenylether, 4,4'-diaminodiphenylsulfide, 4,4'-diaminodiphenylmethane, 3,4'-diaminodiphenylmethane, 3,3'-diaminodiphenylmethane, 4,4'-methylene-bis(2-methylaniline), 4,4'-methylene-bis(2,6-dimethylaniline), 4,4'-methylene-bis(2,6-diethylaniline), 4,4'-methylene-bis(2-isopropyl-6-methylaniline), 4,4'-methylene-bis(2,6-diisopropylaniline), 4,4'-diaminodiphenylsulfone, 3,3'-diaminodiphenylsulfone, benzidine, o-tolidine, m-tolidine, 3,3',5,5'-tetramethylbenzidine, 2,2'-bis(trifluoromethyl)benzidine, 1,4-bis(4-aminophenoxy)benzene, 1,3-bis(4-aminophenoxy)benzene, 1,3-bis(3-aminophenoxy)benzene, bis[4-(4-aminophenoxy)phenyl]sulfone, bis[4-(3-aminophenoxy)phenyl]sulfone, 2,2-bis[4-(4-aminophenoxy)phenyl]propane, and 2,2-bis[4-(3-aminophenoxy)phenyl]propane; and at least one aliphatic diamine selected from the group consisting of 1,6-hexanediamine, 1,4-cyclohexanediamine, 1,3-cyclohexanediamine, 1,4-bis(aminomethyl)cyclohexane, 1,3-bis(aminomethyl)cyclohexane, 4,4'-diaminodicyclohexylmethane, and 4,4'-diamino-3,3'-dimethyldicyclohexylmethane. In addition, the diamine may be a mixture of an aromatic diamine and an aliphatic diamine. However, the diamine is not limited thereto. For example, another well-known diamine may be used.

If the base film 11 is a polyimide film, the polyimide film may satisfy $T1 \geq 0.5 \times T2$ where T1 denotes the thickness of the polyimide film, and T2 denotes a target thickness of a polymer film to be prepared. If the polyimide film does not satisfy the condition, the polyimide film may not resist curling of the polymer precursor 12 when the polyimide film is dried after being coated with the polymer precursor 12.

If the base film 11 is one of copper foil, aluminum foil, stainless steel foil, copper foil coated with polyimide, aluminum foil coated with polyimide, and stainless steel foil coated with polyimide, the base film 11 may satisfy T3≥0.1× T2 where T3 denotes the thickness of the base film 11, and T2 denotes a target thickness of a polymer film to be prepared. If the base film 11 is one of copper foil, aluminum foil, stainless steel foil, copper foil coated with polyimide, aluminum foil coated with polyimide, and stainless steel foil coated with polyimide that do not satisfy the condition, the base film 11 may not resist curling of the polymer precursor 12 when the base film 11 is dried after coated with the polymer precursor 12.

A side of the base film 11 onto which the polymer precursor 12 is cast may have a surface roughness Rz of 0.01 nm to 1000 nm. If the surface roughness of the base film 11 is greater than the range, the surface roughness of the base film 11 may be transferred to a prepared polymer film 21, and thus the polymer film 21 may have poor optical characteristics. Surface roughness may be measured by a method commonly used in the related art. For example, surface roughness may be measured using Mitutoyo SJ-401. For example, a polymer film may be cut to a size of 10 mm×10 mm, and after placing the polymer film on glass, the surface roughness of the polymer film may be measured while moving a tip at a rate of 0.1 mm/s.

The width and length of the base film 11 are not particularly limited. For example, the width and length of the base film 11 may vary according to the width and length of a polymer film 21 to be prepared. For example, the base film 11 may have a width of about 100 mm to about 5000 mm and a length of about 10 m to about 2000 m.

The base film 11 may be prepared in a wound state. In this case, the polymer precursor 12 may be cast (process A11), dried (process A12), and cured (process A13) by a roll-to-roll method to reduce manufacturing costs and improve production yield.

Polymer Precursor Casting Process

A polyimide precursor having a solid content within the range of 3 wt % to 30 wt % and a viscosity within the range of about 1,000 cPs to about 500,000 cPs may be cast (process A11) as the polymer precursor 12 onto the base film 11. In this case, the polyimide precursor may include fluorine or may not include fluorine. If the polyimide precursor includes fluorine, the content of fluorine in the polyimide precursor may range from 1 wt % to 30 wt % based on the total weight of carbon in the polyimide precursor. The polyimide precursor may be prepared by combining dianhydride and diamine.

For example, the dianhydride may include at least one selected from the group consisting of pyromellitic dianhydride (PMDA), 3,3',4,4'-biphenyl tetracarboxylic dianhydride (BPDA), 3,3',4,4'-benzophenone tetracarboxylic dianhydride (BTDA), 4,4'-oxydiphthalic anhydride (ODPA), 3,3',4,4'-diphenylsulfone tetracarboxylic dianhydride (DSDA), 2,2-bis(3,4-dicarboxyphenyl)1,1,1,3,3,3-hexafluoropropane dianhydride (6FDA), 4,4'-(4,4'-isopropylidenediphenoxy)bis(phthalic anhydride) (BPADA), 2,3,6,7-naphthalene tetracarboxylic dianhydride, 1,2,5,6-naphthalene tetracarboxylic dianhydride, 1,4,5,8-naphthalene tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,3',4'-biphenyl tetracarboxylic dianhydride, 2,2',3,3'-biphenyl tetracarboxylic dianhydride, 2,3,3',4'-benzophenone tetracarboxylic dianhydride, 2,2',3,3'-benzophenone tetracarboxylic dianhydride, 2,2-bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis-(2,3-dicarboxyphenyl)methane dianhydride, bis-(3,4-dicarboxyphenyl) methane dianhydride, 4,4'-(hexafluoroisopropylidene) isophthalic anhydride, bis-(3,4-dicarboxyphenyl)sulfoxide dianhydride, tetrahydrofuran-2,3,4,5-tetracarboxylic dianhydride, pyrazine-2,3,5,6-tetracarboxylic dianhydride, thiophene-2,3,4,5-tetracarboxylic dianhydride, phenanthrene-1,8,9,10-tetracarboxylic dianhydride, perylene-3,4,9,10-tetracarboxylic dianhydride, bis-1,3-isobenzofurandione, bis-(3,4-dicarboxyphenyl)thioether dianhydride, bicyclo[2,2,2]oct-7-ene-2,3,5,6-tetracarboxylic dianhydride, 2-(3',4'-dicarboxyphenyl) 5,6-dicarboxybenzamidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, bis-(3,4-dicarboxyphenyl) 2,5-oxadiazole 1,3,4-dianhydride, bis-2,5-(3',4'-dicarboxydiphenylether) 1,3,4-oxadiazole dianhydride, bis-2,5-(3',4'-dicarboxydiphenylether) 1,3,4-oxadiazole dianhydride, 5-(2,5-dioxotetrahydro)-3-methyl-3-cyclohexene-1,2-dicarboxylic anhydride, 1,2,3,4-cyclobutane dianhydride, and 2,3,5-tricarboxycyclopentylacetic dianhydride. However, the dianhydride is not limited thereto. For example, another well-known dianhydride may be used.

Examples of the diamine may include: at least one aromatic diamine selected from the group consisting of p-phenylenediamine, m-phenylenediamine, 2,4,6-trimethyl-1,3-phenylenediamine, 2,3,5,6-tetramethyl-1,4-phenylenediamine, 4,4'-diaminodiphenylether, 3,4'-diaminodiphenylether, 3,3'-diaminodiphenylether, 4,4'-diaminodiphenylsulfide, 4,4'-diaminodiphenylmethane, 3,4'-diaminodiphenylmethane, 3,3'-diaminodiphenylmethane, 4,4'-methylene-bis(2-methylaniline), 4,4'-methylene-bis(2,6-dimethylaniline), 4,4'-methylene-bis(2,6-diethylaniline), 4,4'-methylene-bis(2-isopropyl-6-methylaniline), 4,4'-methylene-bis(2,6-diisopropylaniline), 4,4'-diaminodiphenylsulfone, 3,3'-diaminodiphenylsulfone, benzidine, o-tolidine, m-tolidine, 3,3',5,5'-tetramethylbenzidine, 2,2'-bis(trifluoromethyl)benzidine, 1,4-bis(4-aminophenoxy)benzene, 1,3-bis(4-aminophenoxy)benzene, 1,3-bis(3-aminophenoxy)benzene, bis[4-(4-aminophenoxy) phenyl]sulfone, bis[4-(3-aminophenoxy)phenyl]sulfone, 2,2-bis[4-(4-aminophenoxy)phenyl]propane, and 2,2-bis[4-(3-aminophenoxy)phenyl]propane; and at least one aliphatic diamine selected from the group consisting of 1,6-hexanediamine, 1,4-cyclohexanediamine, 1,3-cyclohexanediamine, 1,4-bis(aminomethyl)cyclohexane, 1,3-bis(aminomethyl) cyclohexane, 4,4'-diaminodicyclohexylmethane, and 4,4'-diamino-3,3'-dimethyldicyclohexylmethane. However, the diamine is not limited thereto, and another well-known diamine may be used.

For ease of description, the case in which the polymer precursor 12 is a polyimide precursor is described. However, the polymer precursor 12 is not limited to the polyimide precursor. That is, any polymer precursor such as polyamide or polyamideimide that is used for preparing transparent film in the related art may be used.

A well-known solvent may be used. For example, at least one polar solvent selected from m-cresol, N-methyl-2-pyrrolidone (NMP), dimethylformamide (DMF), dimethylacetamide (DMAc), dimethyl sulfoxide (DMSO), acetone, and diethyl acetate may be used. In addition, a low boiling point solvent such as tetrahydrofuran (THF) or chloroform, or a low-absorption solvent such as γ-butyrolactone may be used.

Before the polymer precursor 12 is cast onto the base film 11 (process A11), the base film 11 is stably disposed. A roll-to-roll apparatus including an unwinder 14 and a rewinder 15 may be used to stably dispose the base film 11. If the roll-to-roll apparatus is used, a casting belt or drum may not be used because the base film 11 is directly coated with a solution of the polymer precursor 12 when the base film 11 is transferred to the drying apparatus 13 after the base film 11 is connected between the unwinder 14 and the rewinder 15. Although not specifically shown in the drawings, guide rolls may guide the base film 11 between the unwinder 14 and the rewinder 15, and the base film 11 may be coated with a solution of the polymer precursor 12 in a position on a coating roll.

The unwinder 14 and the rewinder 15 of the roll-to-roll apparatus may apply a certain degree of tension to the base film 11 such that the casting process A11 and the drying process A12 may be stably performed. In this case, the tension may range from 1 N to 1000 N.

Polymer Precursor Drying Process

After the polymer precursor 12 is cast onto the base film 11, the polymer precursor 12 is dried using the drying apparatus 13. As a result, a precursor film 16 is formed on the base film 11. Although only the precursor film 16 is illustrated in the drawings, the precursor film 16 is formed on the base film 11. The drying apparatus 13 may be integrated with the roll-to-roll apparatus. Therefore, the drying process A12 may be performed in a state in which the polymer precursor 12 is cast onto at least one side of the base film 11, and the unwinder 14 and the rewinder 15 apply tension to the base film 11. In this case, the tension may range from 1 N to 1000 N.

The drying process A12 may be performed in a chamber isolated from the outside. In other words, the drying apparatus 13 may include a drying chamber. In this case, the pressure inside the drying chamber may range from about −500 Pa to about 500 Pa. Nitrogen or argon may be introduced into the drying chamber. The drying apparatus 13 is not limited to a particular type. For example, a drying apparatus well known in the related art may be used as the drying apparatus 13.

In the drying process A12, the polymer precursor 12 cast onto the base film 11 may be dried at a temperature of 20° C. to 200° C. The drying process A12 may be performed for about 2 minutes to about 100 minutes. If the drying process A12 is performed for less than 2 minutes, the polymer precursor 12 may not be sufficiently dried, and if the drying process A12 is performed for more than 100 minutes, manufacturing costs may increase.

Precursor Film Curing Process

After drying the polymer precursor 12, the precursor film 16 formed through the drying process is cured using the curing apparatus 17. Curing of the precursor film 16 may also be performed using a roll-to-roll apparatus, and in this case, the roll-to-roll apparatus may include an unwinder 18, a rewinder 19, and the curing apparatus 17. In this case, a curing process A13 may be performed in a state in which the unwinder 18 and the rewinder 19 apply a certain degree of tension to the base film 11 and the precursor film 16 formed on the base film 11. For example, the tension may range from 1 N to 1000 N.

The curing apparatus 17 is not limited to a particular type. In a non-limiting example, an apparatus configured to transfer heat by irradiating a film with infrared (IR) rays may be used as the curing apparatus 17.

The curing process A13 may be performed in a chamber isolated from the outside. In other words, the curing apparatus 17 may include a heat treatment chamber. In this case, the pressure inside the heat treatment chamber may range from −500 Pa to 500 Pa. Nitrogen or argon may be introduced into the heat treatment chamber.

The curing process A13 may be performed by heat treating the precursor film 16, which is the dried polymer precursor 12, at a temperature of 80° C. to 550° C. The curing process A13 may be performed for 2 minutes to 100 minutes. If the curing process A13 is performed for less than 2 minutes, the precursor film 16 may not be sufficiently heat-treated, and thus an imide film may not be formed. Conversely, if the curing process A13 is performed for more than 100 minutes, manufacturing costs may increase.

Although FIG. 2 illustrates that the drying process A12 and the curing process A13 are discontinuously performed, this is an example. That is, unlike the illustration, the drying process A12 and the curing process A13 may be continuously performed. That is, as illustrated in FIG. 3, the precursor film 16 formed on the base film 11 through the drying process A13 may not be wound but may be continuously transferred to the curing apparatus 17, and the curing process A13 may be continuously performed.

FIG. 4 is a cross-sectional view schematically illustrating an example of the polymer film 21 formed on the base film 11.

Referring to FIG. 4, the polymer film 21 is formed on the base film 11. The polymer film 21 may have a light transmittance of 80% or greater and a haze of less than 10% in a visible light region. The light transmittance and haze may be measured by a method commonly used in the related art. For example, COH400 by Nippon Denshoku may be used to measure light transmittance and haze. In detail, the polymer film 21 may be cut to a size of 50 mm×50 mm and placed in a path of an optical source, and then the light transmittance and haze of the polymer film 21 may be measured according to the wavelength of light.

Unlike in the drawings, the polymer precursor 12 may be cast onto both sides of the base film 11 and may be dried and cured to form polymer films 21 on both sides of the base film 11.

Polymer Film Separating Process

A separating apparatus configured to separate the polymer film 21 from the base film 11 may include two rewinders 19 and 20 to respectively wind the base film 11 and the polymer film 21. In addition, although not specifically shown in the drawings, the separating apparatus may include a protective film insertion device.

The protective film insertion device may insert a protective film for protecting and supporting the separated polymer film 21. The protective film insertion device is not limited to a particular type as long as the protective film insertion device is capable of the above-mentioned function. In addition, various protective films may be used according to the characteristics and use of the polymer film 21.

[Mode for Invention]

EXPERIMENTAL EXAMPLES

In examples and comparative examples in Tables 1 to 3, as described above, drying processes were performed using a drying apparatus including an unwinder, a rewinder, and a drying chamber, and curing processes were performed using a heat treatment apparatus including an unwinder, a rewinder, a curing apparatus, and a heat treatment chamber. In addition, a polymer precursor was prepared by mixing bis(trifluoromethyl)-[1,1'-biphenyl]-4,4'-diamine (TFMB) with 2,2'-bis-(3,4-dicarboxyphenyl)hexafluoropropane dianhydride (6FDA) at a mole ratio of 1:1, and the prepared polymer precursor had a solid content of 11 wt % and a viscosity of 12,000 cPs.

Table 1 shows whether polymer films prepared using polyimide films as base films were defective or not according to the thicknesses of the base films.

In the examples and comparative examples shown in Table 1, a drying process was performed for 50 minutes at a temperature of 50° C. to 150° C., and then a heat treatment process was performed for 25 minutes at a temperature of 80° C. to 300° C. In the examples, the thicknesses of base films were set in accordance with the above-described condition about T1 and T2, and in the comparative examples, the thicknesses of base films were not set in accordance with the condition about T1 and T2. The base films and the polymer films prepared under the conditions of the examples and the comparative examples were observed with the naked eye to check for defects such as twisting or deformation in appearance.

TABLE 1

| | Base film thickness (T1) | Polymer film thickness (T2) | T1/T2 | Defects |
|---|---|---|---|---|
| *CE1 | 10 μm | 51 μm | 0.20 | Defective |
| CE2 | 20 μm | 52 μm | 0.38 | Defective |
| CE3 | 20 μm | 101 μm | 0.20 | Defective |
| CE4 | 40 μm | 99 μm | 0.40 | Defective |
| *E1 | 25 μm | 50 μm | 0.50 | Non-defective |
| E2 | 30 μm | 48 μm | 0.63 | Non-defective |
| E3 | 50 μm | 99 μm | 0.51 | Non-defective |
| E4 | 70 μm | 100 μm | 0.70 | Non-defective |

*CE: Comparative Example,
**E: Example

Referring to Table 1, in Examples 1 to 4 satisfying the condition of T1≥0.5×T2, the base films and the polymer films were not defective. However, in Comparative Examples 1 to 4 not satisfying the condition of T1≥0.5×T2, the base films and the polymer films had external defects such as twisting or deformation in appearance.

Table 2 shows whether the polymer films were defective according to the thicknesses of the base films for the case in which each of the base films was one of copper foil, aluminum foil, stainless steel foil, copper foil coated with polyimide, aluminum foil coated with polyimide, and stainless steel foil coated with polyimide.

In the examples and comparative examples shown in Table 2, a drying process was performed for 50 minutes at a temperature of 50° C. to 150° C., and then a heat treatment process was performed for 25 minutes at a temperature of 80° C. to 300° C. In the examples, the thicknesses of base films were set in accordance with the above-described condition about T3 and T2, and in the comparative examples, the thicknesses of base films were not set in accordance with the condition about T3 and T2. The base films and the polymer films prepared under the conditions of the examples and the comparative examples were observed with the naked eye to check defects such as twisting or deformation in appearance.

TABLE 2

| | Base film thickness (T3) | Polymer film thickness (T2) | T3/T2 | Defects |
|---|---|---|---|---|
| *CE5 | 5 μm | 102 μm | 0.05 | Defective |
| CE6 | 7 μm | 98 μm | 0.07 | Defective |
| CE7 | 10 μm | 151 μm | 0.07 | Defective |
| CE8 | 12 μm | 149 μm | 0.08 | Defective |
| **E5 | 10 μm | 99 μm | 0.10 | Non-defective |
| E6 | 50 μm | 101 μm | 0.50 | Non-defective |
| E7 | 100 μm | 150 μm | 0.67 | Non-defective |
| E8 | 150 μm | 152 μm | 0.99 | Non-defective |

*CE: Comparative Example,
**E: Example

Referring to Table 2, in Examples 5 to 8 satisfying the condition of T3≥0.1×T2, the base films and the polymer films were not defective. However, in Comparative Examples 5 to 8 not satisfying the condition of T3≥0.1×T2, the polymer films had external defects such as twisting or deformation in appearance.

Table 3 shows results of inspection on defects of polymer films according to the surface roughness of base films.

In the examples and comparative examples shown in Table 3, a drying process was performed for 50 minutes at a temperature of 50° C. to 150° C., and then a heat treatment process was performed for 25 minutes at a temperature of 80° C. to 300° C. In the examples, surface roughness was set in accordance with the above-described condition, and in the comparative examples, surface roughness was not set in accordance with the above-described condition. The base films and the polymer films prepared under the conditions of the examples and the comparative examples were inspected to determine whether the films were optically defective.

TABLE 3

| | Surface roughness (Rz) of base film | Defects |
|---|---|---|
| *CE9 | 1500 nm | Poor optical characteristics (Haze: 10% or greater) |
| CE10 | 2000 nm | Poor optical characteristics (Haze: 10% or greater) |
| CE11 | 2500 nm | Poor optical characteristics (Haze: 10% or greater) |
| *E9 | 50 nm | Non-defective |
| E10 | 100 nm | Non-defective |
| E11 | 250 nm | Non-defective |
| E12 | 500 nm | Non-defective |

*CE: Comparative Example,
**E: Example

Referring to Table 3, polymer films of Examples 9 to were not defective. However, polymer films of Comparative Examples 9 to 11 had poor optical characteristics, for example, a haze of 10% or greater.

Table 4 shows results of inspection of defects of polymer films according to drying and curing conditions and the types of flexible base films. In examples, drying and curing conditions and base film types were set in accordance with the above-described conditions, and in comparative examples, some of drying and curing conditions and base film types were not set in accordance with the above-described conditions. The polymer films prepared under the conditions of the examples and the comparative examples were observed with the naked eye to check for defects such as visible twisting, drying failure, or deformation.

TABLE 4

| | Drying Temp. Min/Max [° C.] | Total drying time [min] | Curing Temp. Min/Max [° C.] | Total curing time [min] | Base film type | Base film ***Th [μm] | Product Th [μm] | Defects |
|---|---|---|---|---|---|---|---|---|
| *E13 | 50/150 | 20 | 80/300 | 25 | PI film | 50 | 10 | Non-defective |
| E14 | 50/150 | 20 | 80/300 | 25 | PI film | 100 | 50 | Non-defective |
| E15 | 50/80 | 50 | 80/300 | 20 | PI film | 100 | 50 | Non-defective |
| E16 | 50/150 | 20 | 80/300 | 12 | PI film | 100 | 50 | Non-defective |
| E17 | 50/150 | 20 | 80/300 | 25 | PI film | 125 | 100 | Non-defective |
| E18 | 80/120 | 15 | 100/250 | 25 | PI film | 100 | 50 | Non-defective |
| **CE12 | 50/80 | 1 | 80/300 | 1 | PI film | 100 | Product was not formed | External defect (drying did not occur) |
| CE13 | 50/150 | 20 | 80/300 | 25 | PET film | 100 | Product was not formed | External defect (deformation of base film) |

*E: Example,
**CE: Comparative Example,
***Th: Thickness

Defects were not present on polymer films of Examples 13 to 18 in which the temperature and period of drying, the temperature and period of curing, and the type of base films were set in accordance with the above-described conditions. However, in Comparative Example 12 in which each of drying and curing was performed for a short period of time, 1 minute, a defect was observed. That is, a product was not produced because of failure in drying. Furthermore, in Comparative Example 13 in which a polyethylene terephthalate film was used as a base film, the base film might have deformed during a drying process and a curing process, and thus a polymer film was not formed.

While embodiments of the present disclosure have been shown and described above, the scope of the present invention is not limited thereto, and it will be apparent to those skilled in the art that modifications and variations could be made without departing from the scope of the present invention as defined by the appended claims.

DESCRIPTIONS OF REFERENCE NUMERALS

| | |
|---|---|
| 1: polymer precursor | 2: drying equipment |
| 3: precursor film | 4: high-temperature heat treatment apparatus |
| 5: base film | 6: polymer film |
| A1: casting process | A2: drying process |
| A3: curing process | |
| 11: base film | 12: polymer precursor |
| 13: drying apparatus | 14: unwinder |
| 15: rewinder | 16: precursor film |
| 17: curing apparatus | 18: unwinder |
| 19, 20: rewinders | 21: polymer film |
| A11: casting process | A12: drying process |
| A13: curing process | |

The invention claimed is:

1. A method for manufacturing a polymer film, the method comprising:
transferring a wound base film to a drying apparatus;
casting a polymer precursor onto the base film during the transferring of the base film;
drying the polymer precursor, cast onto the base film during the transferring, by using the drying apparatus to form a precursor film;
transferring the base film, on which the precursor film is formed, to a curing apparatus;
curing the precursor film formed on the base film by using the curing apparatus so as to form a polymer film; and
separating the polymer film from the base film,
wherein the curing of the precursor film is performed using a roll-to-roll apparatus,
the roll-to-roll apparatus comprises an unwinder and a rewinder, and
the unwinder and the rewinder apply a predetermined degree of tension to the base film, and
wherein the tension ranges from 1 N to 1000 N,
wherein a side of the base film on which the precursor film is placed has a surface roughness Rz of 0.01 nm to 1000 nm,
wherein the polymer film has a haze of less than 10% and a light transmittance of 80% or greater in a visible light region, and
wherein the polymer precursor is a polyimide precursor, and the polymer film is a polyimide film.

2. The method of claim 1, wherein the base film is a polyimide film.

3. The method of claim 2, wherein the polyimide film and the polymer film satisfy $T1 \geq 0.5 \times T2$ where T1 denotes a thickness of the polyimide film, and T2 denotes a thickness of the polymer film.

4. The method of claim 1, wherein the base film is one selected from the group consisting of copper foil, aluminum foil, stainless steel foil, copper foil coated with polyimide, aluminum foil coated with polyimide, and stainless steel foil coated with polyimide.

5. The method of claim 4, wherein the base film and the polymer film satisfy $T3 \geq 0.1 \times T2$ where T3 denotes a thickness of the base film, and T2 denotes a thickness of the polymer film.

6. The method of claim 1, wherein the drying of the polymer precursor is performed at a temperature of 20° C. to 200° C. for 2 minutes to 100 minutes.

7. The method of claim 1, wherein the curing of the precursor film is performed at a temperature of 80° C. to 550° C. for 2 minutes to 100 minutes.

8. The method of claim 1, wherein the roll-to-roll apparatus does not comprise a tenter device.

* * * * *